(12) United States Patent
Plessier et al.

(10) Patent No.: US 7,649,990 B2
(45) Date of Patent: Jan. 19, 2010

(54) APPARATUS TO IMPLEMENT DUAL HASH ALGORITHM

(75) Inventors: Bernard Plessier, Mougins (FR); Ming-Kiat Yap, Singapore (SG)

(73) Assignee: STMicroelectronics Asia Pacific Pte. Ltd., Singapore (SG)

( * ) Notice: Subject to any disclaimer, the term of this patent is extended or adjusted under 35 U.S.C. 154(b) by 79 days.

(21) Appl. No.: 10/531,843

(22) PCT Filed: Oct. 21, 2002

(86) PCT No.: PCT/SG02/00245

§ 371 (c)(1),
(2), (4) Date: Mar. 29, 2007

(87) PCT Pub. No.: WO2004/042602

PCT Pub. Date: May 21, 2004

(65) Prior Publication Data

US 2008/0123841 A1    May 29, 2008

(51) Int. Cl.
*H04L 9/32* (2006.01)
*H04K 1/00* (2006.01)
*H04L 9/00* (2006.01)
*H04L 1/00* (2006.01)
*H03K 17/16* (2006.01)
*H03K 19/003* (2006.01)

(52) U.S. Cl. .................... 380/28; 713/168; 713/170; 713/180; 713/181; 326/28

(58) Field of Classification Search .................. 713/180, 713/181; 380/28
See application file for complete search history.

(56) References Cited

U.S. PATENT DOCUMENTS

| 5,778,069 | A | 7/1998 | Thomlinson et al. |
| 6,300,791 | B1 * | 10/2001 | Jain ............................. 326/38 |
| 2001/0001155 | A1 * | 5/2001 | Smith et al. ................. 713/170 |
| 2002/0066014 | A1 * | 5/2002 | Dworkin et al. ............. 713/168 |

OTHER PUBLICATIONS

SHA-1 High Performance Hash Function, URL=http://www.alma-tech.com, download date Dec. 27, 2002.
SHA-256 Crypt Core Family, URL=http://www.hdl-dh.com, download date Dec. 27, 2002.

* cited by examiner

*Primary Examiner*—Shin-Hon Chen
(74) *Attorney, Agent, or Firm*—David V. Carlson; Lisa K. Jorgenson

(57) ABSTRACT

An apparatus arranged to accept digital data as an input and to process the data according to one of either the Secure Hash Algorithm (SHA-1) or Message Digest (MD5) algorithm to produce a fixed length output word. The apparatus includes a plurality of rotational registers for storing data, one of the registers arranged to receive the input data, and data stores for initialization of some of the plurality of registers according to whether the SHA-1 or MD5 algorithm is used. The data stores include fixed data relating to SHA-1 and MD5 operation. Also included is a plurality of dedicated combinatorial logic circuits arranged to perform logic operations on data stored in selected ones of the plurality of registers.

20 Claims, 2 Drawing Sheets

APPARATUS TO IMPLEMENT DUAL HASH ALGORITHM

BACKGROUND OF THE INVENTION

1. Field of the Invention

The present invention relates to an efficient hardware implementation of the Secure Hash Algorithm (SHA-1) and Message Digest Algorithm (MD5).

2. Description of the Related Art

Hash algorithms and message digests are frequently used in applications such as digital signatures, where it is desirable to verify the authenticity of a document or file. Techniques for producing message digests are beneficial as they reduce the amount of data processing needed to a manageable and consistent level.

The Secure Hash algorithm (SHA-1) is specified in Secure Hash Standard (FIPS PUB 180-1) and is an algorithm that operates on an input data file to produce a condensed representation of that file. Specifically, a message of arbitrary length is processed to produce a message digest consisting of exactly 160 bits.

The Message Digest Algorithm (MD5), developed by Professor Ronald Rivest, has a similar function. It accepts inputs of arbitrary length and produces an output message digest consisting of exactly 128 bits.

Both algorithms may be used as a constituent part of a digital signature application. Both algorithms are computationally intensive and, when implemented in software, as is the norm in prior systems, can take a great number of processor clock cycles to complete.

BRIEF SUMMARY OF THE INVENTION

The disclosed embodiments of the present invention therefore aim to overcome problems with the implementation of these systems, particularly in relation to speed of operation and power consumption.

In a first broad form of one embodiment of the present invention, an apparatus arranged to accept digital data as an input and to process the data according to one of either the Secure Hash Algorithm (SHA-1) or Message Digest (MD5) algorithm to produce a fixed length output word is provided. The apparatus includes a plurality of rotational registers for storing data, one of the registers being arranged to receive the input data, and data stores for initialization of some of the plurality of registers according to whether the SHA-1 or MD5 algorithm is used, the data stores including fixed data relating to SHA-1 and MD5 operation, and a plurality of dedicated combinatorial logic circuits arranged to perform logic operations on data stored in selected ones of the plurality of registers.

Preferably, the register that receives the input data is arranged to receive the input data serially.

Preferably, the registers and combinatorial logic circuits are interconnected for communication via a pair of data busses. It is particularly preferable if the registers and combinatorial logic circuits are connected to write to a respective bus via respective tristate buffers.

Preferably, the apparatus includes a control circuit arranged to generate individually gated clock signals for each register. This results in lower power consumption as only active registers need to be clocked.

Preferably, the control circuit is further arranged to generate individual enabling signals to control the tristate buffers. The control circuit may be implemented as a dedicated state machine or by another means such as a microcontroller.

Preferably, the rotational registers are arranged to be multiplexed prior to connection to a tristate buffer. This results in a lower bus loading.

Preferably, the combinatorial logic circuits include a copy circuit, a shift left circuit, a NOT circuit, an ADD circuit, an OR circuit, an AND circuit and an XOR circuit. Each circuit is dedicated to its particular task, avoiding redundancy.

Preferably, the apparatus is implemented as an integrated circuit, typically of the ASIC type. The apparatus may be incorporated with other apparatus, typically digital signature apparatus.

Embodiments of the present invention utilize the fact that both algorithms may be broken down into a series of individual steps. Prior approaches to implementing the algorithms in software do not utilize any specialized hardware components, which results in a relatively slow process. However, embodiments of the invention identify, where possible, the common elements between the MD5 and SHA-1 algorithms and provide specialized hardware components to achieve the required functionality. Hardware is selected to allow for the maximum sharing of components and hence the minimum overall component count.

Embodiments of the present invention allow a relatively small number of dedicated components to be used in a circuit to efficiently calculate either MD5 or SHA-1 message digests. Since the operations involved in both algorithms are similar, the circuit can be optimized such that components that are common to both algorithms are provided only once. Allowing either of the algorithms to be used in calculating a message digest is advantageous as there are several digital signature systems operational that make use of one or other of the SHA-1 or MD5 algorithms. Systems that utilize an embodiment of the invention will benefit from increased flexibility and speed.

In accordance with another embodiment of the invention, a circuit is provided that includes a plurality of data storage registers for storing data to be processed, a plurality of shift registers for temporary data storage, a plurality of logic circuits for performing operations on data, and a control circuit configured to control the data storage registers, the circular shift registers, and the logic circuits to selectively perform MD5 and SHA-1 operations on data.

In accordance with another aspect of the foregoing embodiment, a plurality of initialization storage registers are provided to store and output initialization data.

In accordance with a further embodiment of the invention, a dual hash algorithm circuit is provided that includes a first bank and a second bank of data storage registers, a first bank and a second bank of circular shift registers, including at least one register to receive a data stream as input to the circuit, a bank of initialization data registers, a bank of temporary data registers, a plurality of combinatorial logic circuits, a read bus and a write bus, a control system for selectively coupling and uncoupling the first bank and second bank of data storage registers, the first bank and second bank of circular shift registers, the bank of initialization data registers, the bank of temporary data registers, and the plurality of combinatorial logic circuits to the read bus and the write bus to selectively perform MD5 and SHA-1 operations on the data to output data of a fixed length in accordance with the selected MD5 and SHA-1 operations.

BRIEF DESCRIPTION OF THE SEVERAL VIEWS OF THE DRAWINGS

For a better understanding of the present invention and to understand how the same may be brought into effect, the invention will now be described by way of example only, with reference to the appended drawings in which.

DETAILED DESCRIPTION OF THE INVENTION

Figure 1:
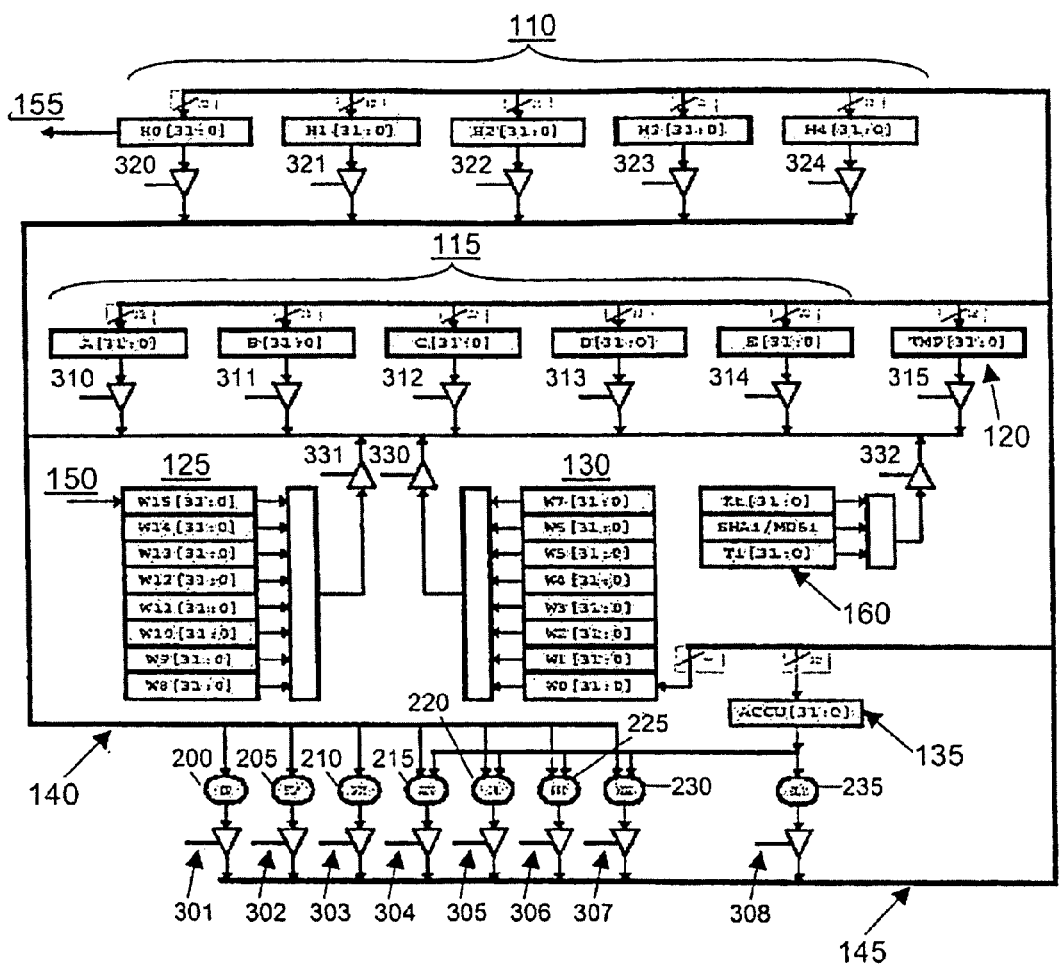
FIG. 1 shows a view of the architecture of the combined SHA-1 and MD5 processor.

FIG. 1 shows a customized architecture which is arranged to receive a data input 150, process it using the shown elements, and produce a data output 155. The hardware shown is able to perform either SHA-1 or MD5 processing on the input data, and has been optimized in order to minimize the amount of hardware needed to perform either one of the algorithms.

The circuit includes a plurality of registers for storing data. There are ten registers provided in two banks 110, 115 for storing part of the data being processed. In addition, two temporary registers 120, 135 are provided for intermediate processing and temporary storage. Also provided are two banks 125, 130 of circular shift registers W15[31:0]–W0[31:0]. Register W15 of bank 125 is arranged to receive the input data 150. Any data held in W15 at that time is shifted to W14; the data in W14 is shifted to W13 and so on, until the data held in W0 is lost. The outputs of banks 125 and 130 are multiplexed before being attached to the read bus 140 by a tristate buffer in order to reduce bus loading.

The registers are mutually interconnected for communication via a read bus 140 and a write bus 145.

The read bus 140 is connected to a range of logic circuits which provide combinatorial functions. These functions are: Copy (CP) 200, Shift Left multiple positions (SL*) 205, NOT 210, ADD 215, OR 220, AND 225, XOR 230 and Shift Left one position (SL1) 235. Functions 200, 205, 210 require only a single input variable and receive it directly from the read bus 140. The other functions 215, 220, 225 and 230 require two input variables and receive one from the read bus 140 and the other from the temporary register (ACCU[31:0]) 135. Register 135 also provides the input for shift register 235.

Also connected to the read bus via a multiplexer and a tristate logic gate is a bank 160 of registers including fixed constants used in the initialization of the circuit for either SHA-1 or MD5 mode calculations. K[t] is provided for initialization of SHA-1, and T[i] is provided for initialization of MD5. In total, approximately seventy five constants each having a length of 32 bits are required, and grouping them together in this fashion allows them to be conveniently accessed. The synthesis tool which places the gates in the finished custom device is then able to optimize the logic, resulting in a smaller gate count, and thus a smaller area of silicon is required.

Calculation of either SHA-1 or MD5 requires the use of selected ones of the provided registers and combinatorial functions. In particular, calculation of the SHA-1 algorithm uses all the registers of bank 110 and of bank 115. Calculation of MD5 requires only the use of four registers (H0-H3) of bank 110 and four registers (A-D) of bank 115. This allows the unused registers to be used for temporary storage if required. However, when the result of the calculation 155 is unloaded from register H0 of bank 110, all five registers are read since they are implemented as shift registers, and this ensures that their contents are unchanged.

All devices that can output data to the read bus 140 are connected to the bus via a tristate buffer. Each buffer is individually enabled via a control signal created by the control circuit shown in FIG. 2. Likewise, the combinatorial functions 200-235 which can write data onto the write bus 145 are connected to the write bus 145 via individually controllable tristate buffers.

The group of clock signals 345 to individual registers are created from a master clock signal 340. The master clock signal is ANDed with a control signal to create a gated clock signal for the appropriate register. In this way, the energy consumption of the complete circuit is reduced because only active registers need to be clocked.

Figure 2:
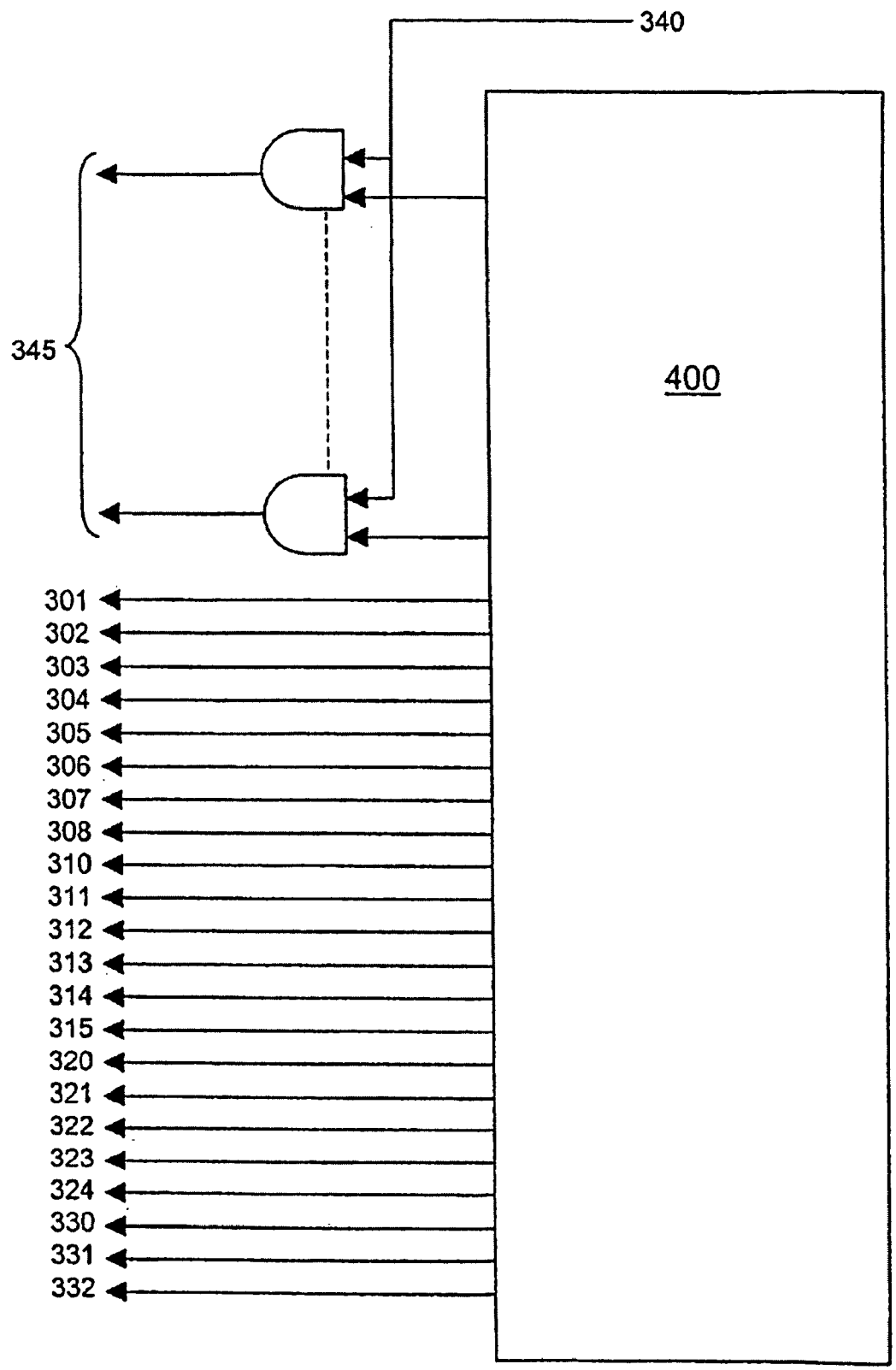
FIG. 2 shows a view of the control circuit used to control the architecture of FIG. 1.

FIG. 2 shows a top level view of the control circuit 400 which generates the various control signals for the circuit of FIG. 1. In particular, it generates, from a master clock signal 340, a series 345 of gated individual clock signals that are used to clock the various registers of FIG. 1. It also generates individual enable signals for each of the tristate buffers shown in FIG. 1. The control circuit may take the form of a finite state machine including associated controlling circuits.

The following pseudo-code represents the steps performed in calculating a message digest according to the SHA-1 algorithm on an input data word of arbitrary length.

The high level algorithm details in broad terms the steps taken in performing a calculation according to the SHA-1 algorithm. The following more detailed code provides step by step instructions on performing the individual instructions needed to calculate the message digest.

SHA-1 Algorithm

```
// High Level Algorithm
initialize SHA-1 internal registers (H0,H1,H2,H3,H4)
for each Mi, block of 512 bits of M do
load Mi into data registers W[0] to W[15]
start core SHA-1
end
unload H0,H1,H2,H3,H4
//Detailed steps
SHA-1 initialization
H0 = 67452301
H1 = EFCDAB89
H2 = 98BADCFE
H3 = 10325476
H4 = C3D2E1F0
Core SHA-1
A=H0, B=H1, C=H2, D=H3, E=H4
MASK=0000000F
for t=0 to 79 do
s = t and MASK;
if (t>=16) W[s] = SL1 ( W[(s + 13) and MASK] xor
W [(s + 8) and MASK] xor
W [(s + 2) and MASK] xor W[s]);
end if
TEMP = SL5(A)+ ft(B,C,D)+E +W[s]+K[t]
E=D, D=C, C=SL30(B), B=A, A=TEMP
end for
H0 =H0+A, H1 =H1+B, H2 =H2+C, H3=H3+D, H4=H4+E
// The functions SL1, SL5 and SL30 are circular left rotation
// of the 32 bit operand by 1 bit, 5 bits and 30 bit
// respectively.
// The constants Kt are defined by the following:
Kt = 5A82 7999 ( 0 <= t <= 19)
Kt = 6ED9 EBA1 (20 <= t <= 39)
Kt = 8F1B BCDC (40 <= t <= 59)
Kt = CA62 C1D6 (60 <= t <= 79).
// The functions ft(B,C,D) is defined by the following:
ft (B,C,D) = (B and C) or ((not B) and D) (0 <= t <= 19)
ft (B,C,D) = B xor C xor D (20 <= t <= 39)
ft (B,C,D) = (B and C) or (B and D) or (C and D) (40 <= t <= 59)
ft (B,C,D) = B xor C xor D (60 <= t <= 79).
```

The following pseudo-code represents the steps performed in calculating a message digest according to the MD5 algorithm on an input data word of arbitrary length.

N05 Pseudo Algorithm

// Here, the four auxiliary functions that each take as input
// three 32-bit words and produce as output one 32-bit word
// are defined:
F (X, Y, Z) = (X and Y) or (not (X) and Z)
G(X,Y,Z) = (X and Z) or (Y and not(Z))
H(X,Y,Z) = X xor Y xor Z
I(X,Y,Z) = Y xor (X or not(Z))
// A 64-element table T[1 ... 64] constructed from the sine
// function is defined. Let T[i] denote the i-th element of
// the table, which is equal to the integer part of 4294967296
// times abs(sin(i)), where i is in radians.
High Level Algorithm
initialize MD5 internal registers (H0,H1,H2,H3)
for each Mi, block of 512 bit of M do
load Mi into data registers W[0] to W[15]
start core MD5
end
unload H0, H1, H2, H3
MD5 initialization
H0 = 67 45 23 01
H1 = ef cd ab 89
H2 = 98 ba dc fe
H3 = 10 32 54 76
Core MD5
A=H0, B=H1, C=H2, D=H3
// Round 1.
// Let (abcd k s i) denote the operation
// a = b + ((a + F(b,c,d) + W[k] + T[i]) <<< s).
// Do the following 16 operations.
[ABCD 0 7 1] [DABC 1 12 2] [CDAB 2 17 3] [BCDA 3 22 4]
[ABCD 4 7 5] [DABC 5 12 6] [CDAB 6 17 7] [BCDA 7 22 8]
[ABCD 8 7 9] [DABC 9 12 10] [CDAB 10 17 11] [BCDA 11 22 12]
[ABCD 12 7 13] [DABC 13 12 14] [CDAB 14 17 15] [BCDA 15 22 16]
// Round 2.
// Let (abcd k s i] denote the operation
// a = b + ((a + G(b,c,d) + W[k] + T[i]) <<< s).
// Do the following 16 operations.
[ABCD 1 5 17] [DABC 6 9 18] [CDAB 11 14 19] [BCDA 0 20 20]
[ABCD 5 5 21] [DABC 10 9 22] [CDAB 15 14 23] [BCDA 4 20 24]
[ABCD 9 5 25] [DABC 14 9 26] [CDAB 3 14 27] [BCDA 8 20 28]
[ABCD 13 5 29] [DABC 2 9 30] [CDAB 7 14 31] [BCDA 12 20 32]
// Round 3.
// Let [abcd k s i] denote the operation
// a = b + ((a + H(b,c,d) + W[k] + T[i]) <<< s).
// Do the following 16 operations.
[ABCD 5 4 33] [DABC 8 11 34] [CDAB 11 16 35] [BCDA 14 23 36]
[ABCD 1 4 37] [DABC 4 11 38] [CDAB 7 16 39] [BCDA 10 23 40]
[ABCD 13 4 41] [DABC 0 11 42] [CDAB 3 16 43] [BCDA 6 23 44]
[ABCD 9 4 45] [DABC 12 11 46] [CDAB 15 16 47] [BCDA 2 23 48]
// Round 4.
// Let [abcd k s i] denote the operation
// a = b + ((a + I (b, c, d) + W [k] + T [i]) <<< s).
// Do the following 16 operations.
[ABCD 0 6 49] [DABC 7 10 50] [CDAB 14 15 51] [BCDA 5 21 52]
[ABCD 12 6 53] [DABC 3 10 541] [CDAB 10 15 55] [BCDA 1 21 56]
[ABCD 8 6 57] [DABC 15 10 58] [CDAB 6 15 59] [BCDA 13 21 60]
[ABCD 4 6 61] [DABC 11 10 62] [CDAB 2 15 63] [BCDA 9 21 64]
H0 =H0+A, H1 =H1+B, H2 =H2+C, H3 =H3+D The information below sets out the so-called atomic operations which are required to perform the different algorithm calculations. The following steps indicate the operation number, the operation performed, and the status of the read 140 and write 145 busses. Each operation listed below takes exactly one clock cycle.

SHA-1 Algorithm

Initialization

| ## | operation | Readbus | Writebus |
|---|---|---|---|
| 01. | A := H0 | H0 | (copy) |
| 02. | B := H1 | H1 | (copy) |
| 03. | C := H2 | H2 | (copy) |
| 04. | D := H3 | H3 | (copy) |
| 05. | E := H4 | H4 | (copy) |

$0<=t<=15$

| ## | operation | Readbus | Writebus |
|---|---|---|---|
| 01. | ACCU := B | B | (copy) |
| 02. | TMP := ACCU and C | C | (and) |
| 03. | ACCU := NOT B | B | (not) |
| 04. | ACCU := ACCU and D | D | (and) |
| 05. | ACCU := ACCU or TMP | TMP | (or) |
| 06. | ACCU := ACCU + W[0] | W[0] | (+) |
| 07. | ACCU := ACCU + E | E | (+) |
| 08. | TMP := SL5(A) | A | (SL5) |
| 09. | ACCU := ACCU + TMP | TMP | (+) |
| 10. | TMP := ACCU + K[t] | K[t] | (+) |
| 11. | E := D | D | (copy) |
| 12. | D := C | C | (copy) |
| 13. | C := SL30(B) | B | (SL30) |
| 14. | B := A | A | (copy) |
| 15. | A := TMP | TMP | (copy) |
| 16. | ROTATE W[i] | | |

$16<=t<=19$

| ## | operation | Readbus | Writebus |
|---|---|---|---|
| 01. | ACCU := B | B | (copy) |
| 02. | TMP := ACCU and C | C | (and) |
| 03. | ACCU := NOT B | B | (not) |
| 04. | ACCU := ACCU and D | D | (and) |
| 05. | TMP := ACCU or TMP | TMP | (or) |
| 06. | ACCU := W[13] | W[13] | (copy) |
| 07. | ACCU := ACCU xor W[8] | W[8] | (xor) |
| 08. | ACCU := ACCU xor W[2] | W[2] | (xor) |
| 09. | ACCU := ACCU xor W[0] | W[0] | (xor) |
| 10. | W[0] := SL1 | (ACCU) | (SL1) |
| 11. | ACCU := W[0] | W[0] | (copy) |
| 12. | ACCU := ACCU + TMP | TMP | (+) |
| 13. | ACCU := ACCU + E | E | (+) |
| 14. | TMP := SL5(A) | A | (SL5) |
| 15. | ACCU := ACCU + TMP | TMP | (+) |
| 16. | TMP := ACCU + K[t] | K[t] | (+) |
| 17. | E := D | D | (copy) |
| 18. | D := C | C | (copy) |
| 19. | C := SL30(B) | B | (SL30) |
| 20. | B := A | A | (copy) |
| 21. | A := TMP | TMP | (copy) |
| 22. | ROTATE W[i] | | |

$20<=t<=39$ and $60<=t<=79$

Final Round

| ## | operation | Readbus | Writebus |
|---|---|---|---|
| 01. | ACCU := A | A | (copy) |
| 02. | H0 := ACCU + H0 | H0 | (+) |
| 03. | ACCU := B | B | (copy) |

-continued

| ## | operation | Readbus | Writebus |
|---|---|---|---|
| 04. | H1 := ACCU + H1 | H1 | (+) |
| 05. | ACCU := C | C | (copy) |
| 06. | H2 := ACCU + H2 | H2 | (+) |
| 07. | ACCU := D | D | (copy) |
| 08. | H3 := ACCU + H3 | H3 | (+) |
| 09. | ACCU := E | E | (copy) |
| 10. | H4 := ACCU + H4 | H4 | (+) |

MD5 Algorithm.

Initialization

| ## | operation | Readbus | Writebus |
|---|---|---|---|
| 01. | A := H0 | H0 | (copy) |
| 02. | B := H1 | H1 | (copy) |
| 03. | C := H2 | H2 | (copy) |
| 04. | D := H3 | H3 | (copy) |

Round 1 (16 iterations): 0<=i<=15; k=0; s=7, 12, 17, 22, 7, 12, 17, 22 . . .

| ## | operation | Readbus | Writebus |
|---|---|---|---|
| 01. | ACCU := B | B | (copy) |
| 02. | TMP := ACCU and C | C | (and) |
| 03. | ACCU := NOT B | B | (not) |
| 04. | ACCU := ACCU and D | D | (and) |
| 05. | TMP := ACCU or TMP | TMP | (or) |
| 06. | ACCU := W [k] | W [k] | (copy) |
| 07. | ACCU := ACCU + A | A | (+) |
| 08. | ACCU := ACCU + T[i] | T[i] | (+) |
| 09. | TMP := ACCU + TMP | TMP | (+) |
| 10. | ACCU := SL[s](TMP) | TMP | (SL[s]) |
| 11. | TMP := ACCU + B | B | (+) |
| 12. | A := D | D | (copy) |
| 13. | D := C | C | (copy) |
| 14. | C := B | B | (copy) |
| 15. | B := TMP | TMP | (copy) |
| 16. | ROTATE W[k] | | |

Preparation for Round 2
  01. ROTATE W[k]

Round 2 (16 iterations): 16<=i<=31; k=1; s=5, 9, 14, 20, 5, 9, 14, 20, 5 . . .

| ## | operation | Readbus | Writebus |
|---|---|---|---|
| 01. | ACCU := B | B | (copy) |
| 02. | TMP := ACCU and D | D | (and) |
| 03. | ACCU := NOT D | D | (not) |
| 04. | ACCU := ACCU and C | C | (and) |
| 05. | TMP := ACCU or TMP | TMP | (or) |
| 06. | ACCU := W[k] | W[k] | (copy) |
| 07. | ACCU := ACCU + A | A | (+) |
| 08. | ACCU := ACCU + T[i] | T[i] | (+) |
| 09. | TMP := ACCU + TMP | TMP | (+) |
| 10. | ACCU := SL[s](TMP) | TMP | (SL[s]) |
| 11. | TMP := ACCU + B | B | (+) |
| 12. | A := D | D | (copy) |
| 13. | D := C | C | (copy) |
| 14. | C := B | B | (copy) |
| 15. | B := TMP | TMP | (copy) |

-continued

| ## | operation | Readbus | Writebus |
|---|---|---|---|
| 16. | ROTATE W[k] | | |
| 17. | ROTATE W[k] | | |
| 18. | ROTATE W[k] | | |
| 19. | ROTATE W[k] | | |
| 20. | ROTATE W[k] | | |

Preparation for Round 3

| | | |
|---|---|---|
| 01. | ROTATE W[k] | |
| 02. | ROTATE W[k] | |
| 03. | ROTATE W[k] | |
| 04. | ROTATE W[k] | |

Round 3 (16 iterations): 32<=i<=47; k=5; s=4, 11, 16, 23, 4, 11, 16 . . .

As an example of how the information above should be interpreted, step number 2 of the SHA-1 initialization section relates to the operation B:=H1, meaning that the register B is set to the value stored in H1. To achieve this, the tristate buffer 321 of register H1 and the tristate buffer 301 of the copy logic are enabled together. At the same time, the clock to register B is enabled, resulting in the data in H1 being written into B. The tristate buffer control and clock signals are generated by the control circuit 400.

Similarly, step number 10 in the SHA-1 0<=t<=15 stage relates to the operation TMP:=ACCU+K[t]. The multiplexer and tristate buffer 332 is enabled for K[10]. The tristate buffer 304 is enabled for the ADD logic 215 and a gated clock signal is created and applied to the TMP register 120. In this way, the rising clock signal causes the sum of the data in K[10] and ACCU to be written into the TMP register.

The last instruction in the 0<=t<=15 stage for SHA-1 (and the 0<=i<=15 stage for MD5) causes the entire Wi chain to be rotated, so that W14 is loaded with the data previously in W15, W13 receives the data previously in W14, and W15 receives the data previously in W0. Advantageously, this instruction may be implemented in parallel with the instruction above it (Step 15) as the rotate instruction does not involve placing data onto the data bus. In this way, one clock cycle per iteration is saved, leading to a total saving of 80 cycles for SHA-1 and 64 cycles for MD5.

The embodiment presented has a bus width of 32 bits. However, it is possible to reduce the bus width to reduce the silicon area of the design at the expense of operational speed. If the bus width is reduced to 16 bits, each 32 bit XOR operation, for example, will take two cycles rather than one cycle if a 32 bit bus was used.

The present invention includes and novel feature or combination of features disclosed herein either explicitly or any generalization thereof irrespective of whether or not it relates to the claimed invention or mitigates any or all of the problems addressed.

From the foregoing it will be appreciated that, although specific embodiments of the invention have been described herein for purposes of illustration, various modifications may be made without deviating from the spirit and scope of the invention. Accordingly, the invention is not limited except as by the appended claims and the equivalents thereof.

The invention claimed is:

1. An apparatus arranged to accept digital data as an input and to process the data according to one of either the Secure Hash Algorithm (SHA-1) or Message Digest (MD5) algorithm to produce a fixed length output word, the apparatus comprising:
   a plurality of rotational registers coupled to a read bus to receive and store data, one of said rotational registers arranged to receive the input data;
   data stores coupled to the read bus for initialization of some of said plurality of rotational registers according to whether the SHA-1 or MD5 algorithm is used, said data stores including fixed data relating to SHA-1 and MD5 operation;
   a plurality of dedicated combinatorial logic circuits having inputs coupled to the read bus and outputs coupled to a write bus and arranged to perform logic operations on data stored in selected ones of said plurality of registers and to output to the write bus;
   a plurality of temporary data storage registers having inputs coupled to the write bus and outputs coupled to the read bus, an output of one of the temporary data storage registers comprising an output of the apparatus for the fixed length output word; and
   a control circuit arranged to combine a master clock signal and a control signal and to generate individually gated clock signals only for each active register.

2. The apparatus of claim 1 wherein the register arranged to receive the input data is arranged to receive said input data serially.

3. The apparatus of claim 1 wherein the registers and combinatorial logic circuits are interconnected for communication via the read and write data busses.

4. The apparatus of claim 3 wherein the registers and combinatorial logic circuits are connected to write to a respective bus via respective tristate buffers.

5. The apparatus of claim 1 wherein said control circuit is further arranged to generate individual enabling signals to control the tristate buffers.

6. The apparatus of claim 1 wherein the rotational registers are arranged to be multiplexed prior to connection to a tristate buffer.

7. The apparatus of claim 1 wherein the combinatorial logic circuits include a copy circuit, a shift left circuit, a NOT circuit, an ADD circuit, an OR circuit, an AND circuit and an XOR circuit.

8. The apparatus of claim 1 wherein the apparatus is implemented as an integrated circuit.

9. The apparatus of claim 1 wherein the apparatus further includes circuitry arranged to perform digital signature creation or authentication.

10. A circuit, comprising:
    a plurality of data storage registers coupled to a read bus to receive and store data to be processed;
    a plurality of shift registers for temporary data storage and having inputs coupled to a write bus and outputs coupled to the read bus, an output of one of the shift registers comprising an output of the circuit;
    a plurality of logic circuits having inputs coupled to the read bus and outputs coupled to the write bus and for performing operations on data and to output to the write bus; and
    a control circuit configured to control the data storage registers, the shift registers, and the logic circuits to selectively perform MD5 and SHA-1 operations on data, the control circuit arranged to combine a master clock signal and a control signal and to generate individually gated clock signals only for each active data storage register.

11. The circuit of claim 10, further comprising a plurality of initialization storage registers coupled to the read bus and adapted to store and output initialization data for the MD5 and SHA-1 operations.

12. The circuit of claim 11 wherein the read bus and the write bus are selectively coupleable to the plurality of data storage registers, the plurality of shift registers, and the plurality of logic circuits by the control circuit.

13. The circuit of claim 10, further comprising a multiplexer to multiplex outputs of the plurality of shift registers to the read bus.

14. A circuit, comprising:
    circuitry for storing data coupled to a read bus to receive and store data to be processed;
    circuitry for temporarily storing the data to be processed and having inputs coupled to a write bus and outputs coupled to the read bus, an output of one of a plurality of shift registers in the circuitry comprising an output of the circuit;
    circuitry for performing combinatorial logic operations having inputs coupled to the read bus and outputs coupled to the write bus and arranged to perform logic operations on the data and output results to the write bus; and
    circuitry for controlling coupling of the data storage circuitry, the temporary data storage circuitry, and the circuitry for performing combinatorial logic operations to the read and write busses to selectively perform MD5 and SHA-1 operations on the data, the controlling circuitry comprising a control circuit arranged to combine a master clock signal and a control signal and to generate individually gated clock signals only for each active data storage circuitry, temporary data storage circuitry, and the shift registers.

15. The circuit of claim 14, further comprising
    circuitry for storing data coupled to the read bus, the data used to initialize the circuit to perform MD5 and SHA-1 operations in response to commands from the control means.

16. The circuit of claim 14, further comprising
    circuitry for multiplexing outputs from the temporary data storage registers to the read bus in response to commands from the control means.

17. The circuit of claim 16 wherein the temporary data storage circuitry is configured to receive a stream of data, and the circuit generates on the output data of a fixed length.

18. A dual hash algorithm circuit, comprising:
    a first bank and a second bank of data storage registers having inputs coupled to a write bus and outputs coupled to a read bus;
    a first bank and a second bank of circular shift registers coupled to a read bus to receive and store data, including at least one register to receive a data stream as input to the circuit;
    a bank of initialization data registers coupled to the read bus;
    a bank of temporary data registers coupled to the read bus;
    a plurality of combinatorial logic circuits having inputs coupled to the read bus and outputs coupled to the write bus; and a control system for selectively coupling and uncoupling the first bank and second bank of data storage registers, the first bank and second bank of circular shift registers, the bank of initialization data registers, the bank of temporary data registers, and the plurality of combinatorial logic circuits to the respective read bus and the write bus to selectively perform MD5 and SHA-1 operations on the data and to output data of a fixed length in accordance with the selected MD5 and SHA-1 operations, the control system comprising a control circuit arranged to combine a master clock signal and a control signal and to generate individually gated clock signals only for each active temporary data register, initialization register, and the first and second banks of circular shift registers and data storage registers.

19. The circuit of claim 18 wherein the control system comprises tristate buffers coupled to the control circuit to couple and uncouple the first bank and second bank of data storage registers, the first bank and second bank of circular shift registers, the bank of initialization data registers, the bank of temporary data registers, and the plurality of combinatorial logic circuits to the respective read and write busses in response to the control circuit.

20. The circuit of claim 18, further comprising a multiplexer configured to multiplex outputs from the first bank and second bank of circular shift registers to the read bus.

* * * * *